US010565208B2

(12) United States Patent
Triou, Jr. et al.

(10) Patent No.: US 10,565,208 B2
(45) Date of Patent: Feb. 18, 2020

(54) ANALYZING MULTIPLE DATA STREAMS AS A SINGLE DATA OBJECT

(71) Applicant: MICROSOFT CORPORATION, Redmond, WA (US)

(72) Inventors: Edward John Triou, Jr., Snoqualmie, WA (US); Fei Xu, Bellevue, WA (US); Hiren Patel, Bellevue, WA (US); Jingren Zhou, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 490 days.

(21) Appl. No.: 13/915,089

(22) Filed: Jun. 11, 2013

(65) Prior Publication Data
US 2014/0297680 A1    Oct. 2, 2014

Related U.S. Application Data

(60) Provisional application No. 61/805,496, filed on Mar. 26, 2013.

(51) Int. Cl.
*G06F 16/2455*    (2019.01)
(52) U.S. Cl.
CPC .............................. *G06F 16/24568* (2019.01)
(58) Field of Classification Search
CPC ......... G06F 17/30224; G06F 17/30445; G06F 17/30103; G06F 17/30442; G06F 17/30516; G06F 16/24568
USPC ...................................................... 707/769
See application file for complete search history.

(56) References Cited

U.S. PATENT DOCUMENTS

| | | | | |
|---|---|---|---|---|
| 6,708,164 B1* | 3/2004 | Cseri | ................. | G06F 17/30569 707/778 |
| 6,836,773 B2 | 12/2004 | Tamayo et al. | | |
| 7,058,720 B1* | 6/2006 | Majidimehr | ...... | H04L 29/06027 709/217 |
| 7,171,408 B2* | 1/2007 | Zuzarte | | |
| 7,672,964 B1* | 3/2010 | Yan | ................... | G06F 17/30516 707/999.102 |

(Continued)

OTHER PUBLICATIONS

Zhou, et al., "SCOPE: Parallel Databases Meet MapReduce", In the VLDB Journal—The International Journal on Very Large Data Bases, vol. 21, Issue 5, Oct. 2012, 26 pages.

(Continued)

*Primary Examiner* — James Trujillo
*Assistant Examiner* — Jessica N Le
(74) *Attorney, Agent, or Firm* — Shook, Hardy & Bacon, LLP

(57) ABSTRACT

Embodiments of the present invention allow multiple data streams to be analyzed as a single data set. The single data set may be described as a stream set herein. The multiple streams that are included in the stream set may be specified through a user script or query. For example, a query may be used to gather all streams created within a date range. The query could include one or more filters to gather certain information from the data streams or to exclude certain data streams that otherwise are in the query's range. A stream may be an unstructured byte stream of data. The stream may be created by append-only writing to the end of the stream. The stream could also be a structured stream that includes metadata that defines column structure and affinity/clustering information.

20 Claims, 9 Drawing Sheets

(56) References Cited

U.S. PATENT DOCUMENTS

| | | | |
|---|---|---|---|
| 8,260,803 | B2 | 9/2012 | Hsu et al. |
| 8,631,034 | B1* | 1/2014 | Peloski .................... 707/770 |
| 2007/0067321 | A1* | 3/2007 | Bissett ................ G06F 9/4428 |
| 2007/0162421 | A1* | 7/2007 | Pang .................. G06F 17/3056 |
| 2008/0005145 | A1* | 1/2008 | Worrall ............ G06F 17/30233 |
| 2009/0150413 | A1* | 6/2009 | Basu et al. .................... 707/100 |
| 2009/0228434 | A1* | 9/2009 | Krishnamurthy ........................... G06F 17/30445 |
| 2010/0106946 | A1* | 4/2010 | Imaki ................ G06F 17/30516 712/220 |
| 2011/0173231 | A1* | 7/2011 | Drissi et al. .................. 707/771 |
| 2011/0313844 | A1* | 12/2011 | Chandramouli ... G06Q 30/0241 705/14.42 |
| 2012/0131025 | A1* | 5/2012 | Cheung ............. G06F 17/30082 707/755 |
| 2012/0233417 | A1* | 9/2012 | Kalach ................ G06F 11/1453 711/162 |
| 2014/0082013 | A1* | 3/2014 | Wolf ................. G06F 17/30442 707/769 |

OTHER PUBLICATIONS

Abramson, et al., "Managing Click-Stream Data", Retrieved on: Apr. 8, 2013, Available at: http://www.syncsort.com/pdf/sswp5.pdf.

Das, et al., "Thread Cooperation in Multicore Architectures for Frequency Counting over Multiple Data Streams", In UCSB Computer Science Technical Report, Apr. 2009, 21 pages.

Alves, et al., "Mining Clickstream-Based Data Cubes", In Proceedings of the 6th International Conference on Enterprise Information Systems, Apr. 14, 2004, 8 pages.

Jung, Jason J., "Semantic Preprocessing of Web Request Streams for Web Usage Mining", In Journal of Universal Computer Science, vol. 11, No. 8, Aug. 28, 2005, 14 pages.

* cited by examiner

ANALYZING MULTIPLE DATA STREAMS AS A SINGLE DATA OBJECT

CROSS-REFERENCE TO RELATED APPLICATIONS

This application claims the benefit of U.S. Provisional Application No. 61/805,496, filed Mar. 26, 2013, entitled "Analyzing Multiple Data Streams as a Single Data Object," which application is hereby incorporated by reference.

BACKGROUND

Companies store and analyze massive data sets, such as search logs, web content collected by crawlers, and click streams collected from a variety of web services. Due to the size of these data sets, traditional parallel database solutions can be prohibitively expensive. Instead of a traditional database, the data may be stored in a stream. A stream is a file to which new data may be appended. For example, an application may create a stream consisting of click data and add each day's click data to the existing stream.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention allow multiple data streams to be retrieved from storage and analyzed as a single data set. The single data set may be described as a stream set herein. The multiple streams that are included in the stream set may be specified through a user script or query. For example, a query may be used to retrieve all streams created within a date range. The query could include one or more filters to gather certain information from the data streams or to exclude certain data streams that otherwise are in the query's range. A stream may be an unstructured byte stream of data. The stream may be created by append-only writing to the end of the stream. The stream could also be a structured stream that includes metadata that defines column structure and affinity/clustering information.

BRIEF DESCRIPTION OF THE DRAWINGS

Embodiments of the invention are described in detail below with reference to the attached drawing figures, wherein.

DETAILED DESCRIPTION

Figure 1:
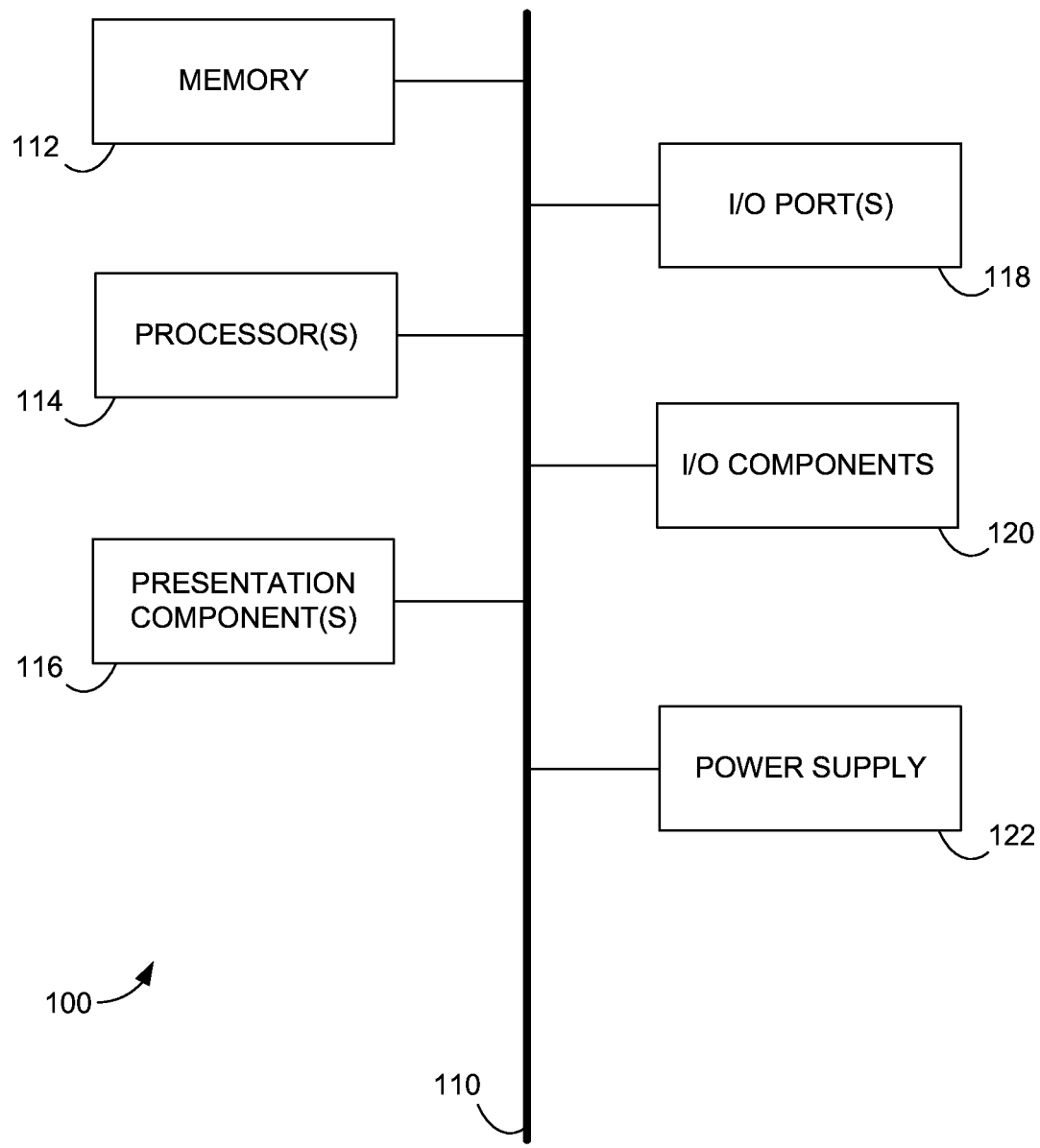
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention allow multiple data streams to be retrieved from storage and analyzed as a single data set. The single data set may be described as a stream set herein. The multiple streams that are included in the stream set may be specified through a user script or query. The script may take the form of an extract statement. For example, a query may be used to gather all streams created within a date range. Once retrieved, an execution plan may specify various operations on the data to produce a final result. The query could include one or more filters to gather certain information from the data streams or to exclude certain data streams that otherwise are in the query's range.

A stream may be an unstructured byte stream of data. The stream may be created by append-only writing to the end of the stream. The stream could also be a structured stream that includes metadata that defines column structure and affinity/clustering information.

As part of stream set construction, the user may be alerted to data streams that satisfy the query but are missing. The user may be given the choice to proceed or terminate the stream set construction process. The decision whether or not to proceed with missing data sets may be taken automatically through default settings.

The stream set may take the form of a table that is populated with data from the streams. The table may include at least one virtual column that includes information that is not found in any of the data streams. A virtual column may be populated with information taken from the data stream's file name. The virtual column may be populated on a row-by-row basis with information from a stream that was the source of the row data. In one embodiment, the virtual column includes information that identifies the stream as the source of the record. Alternatively, the final product is not a table, but row sets are generated using information from the streams and virtual column(s).

Embodiments of the invention may be implemented using the SCOPE (Structured Computations Optimized for Parallel Execution) scripting language. However, embodiments are not limited to the use of SCOPE.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer-storage media does not include communications media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Figure 2:
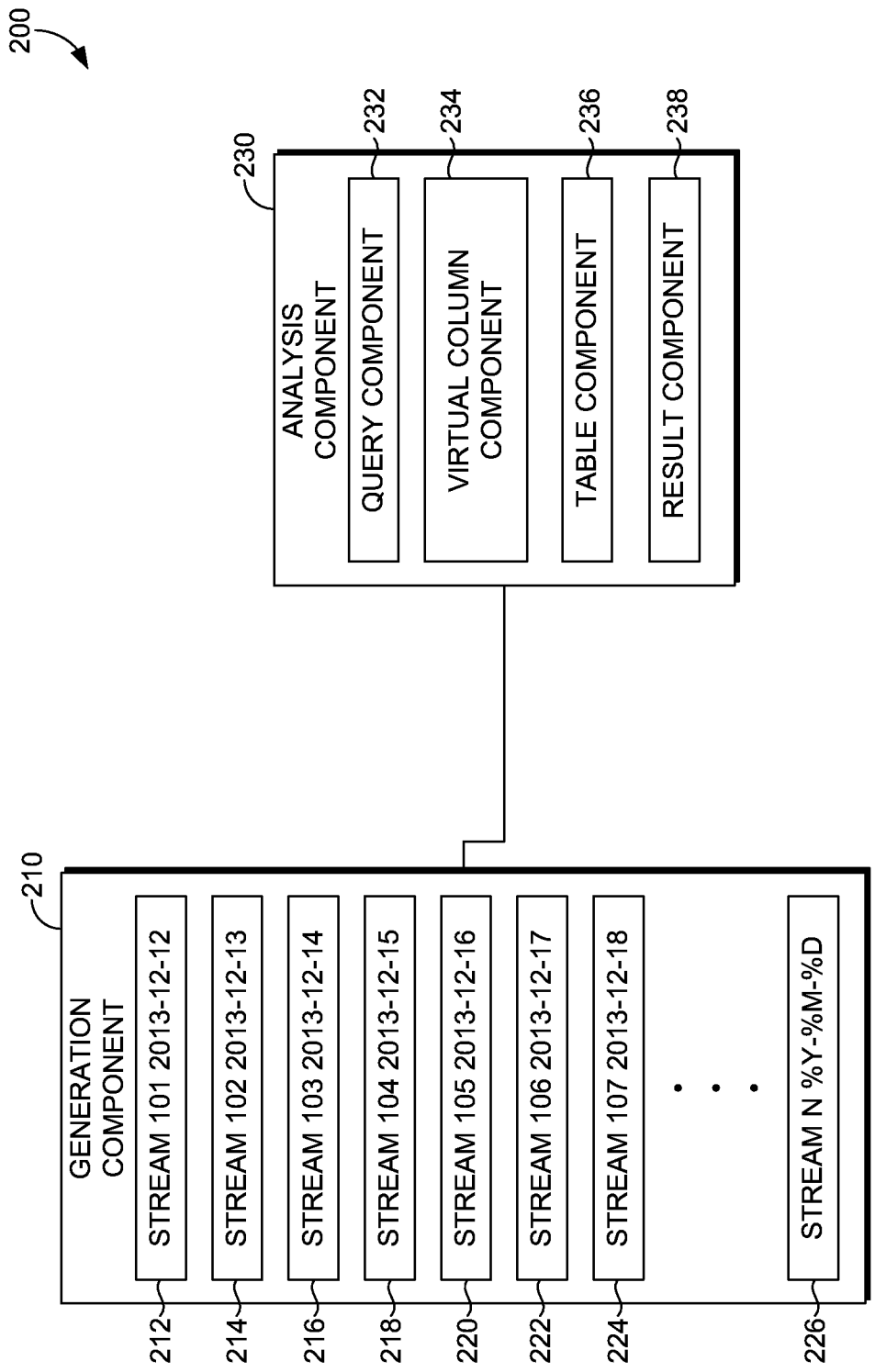
FIG. 2 is a diagram of an exemplary computing environment, in accordance with an embodiment of the present invention.

Turning now to FIG. 2, an exemplary computing environment 200 for generating stream sets is shown, in accordance with an embodiment of the present invention. Computing environment 200 includes a data generation component 210 and a data analysis component 230. Computing environment 200 may be a single computing device, such as computing device 100 shown in FIG. 1. In the alternative, computing environment 200 may be a distributed computing environment that includes multiple computing devices coupled with one another via one or more networks. Such networks may include, without limitation, one or more local area networks (LANs) and/or one or more wide area networks (WANs). Such network environments are commonplace in offices, enterprise/wide computer networks, intranets, and the Internet. Accordingly, the network, or combination of networks, is not further described herein. The computing environment 200 is merely an example of one suitable computing system and is not intended to suggest any limitation as to the scope of the use or functionality of the present invention. Neither should the computing environment 200 be interpreted as having any dependency or requirement related to any single component/module or combination of component/modules illustrated therein.

The data generation component 210 generates data streams. A data stream may be an unstructured byte stream of data. A stream may be created by an append-only writing to the end of the stream. For example, a stream could comprise data describing each click received on a search results page for a time period. Once the time period ends, a new stream is started. So the data generation component 210 may generate a new data stream every hour, every day, or once a threshold amount of data is received. The time associated with the stream title may be the time the stream is closed.

The data generation component 210 is shown having generated several streams. The streams include stream 212, stream 214, stream 216, stream 218, stream 220, stream 222, stream 224, and stream 226. As can be seen, each stream name has a constant value and variable values. The word stream, which could represent a root directory, is constant. The variable values include an integer such as 101, 103, 104, or 107 and a date. The date may be the date on which the last byte was appended to the stream or the date the first byte was added. In one embodiment, both the date the first byte was added and the date the last byte was added to the data stream are included within the stream name to define a range. In one embodiment, variable information in the stream name, such as the date, is not included within the individual stream of data. Instead, the date information may be taken from the stream name and included in a virtual column that is associated with the date record in the data stream during analysis. This eliminates the need to include the date in each record within the data stream.

The data analysis component 230 builds stream sets and provides relevant data to a user. The data analysis component 230 comprises a query component 232, a virtual column component 234, a table component 236, and a result component 238. The data analysis component 230 is merely an example of one suitable computing system and is not intended to suggest any limitation as to the scope of the use or functionality of the present invention. Neither should the data analysis component 230 be interpreted as having any dependency or requirement related to any single component/ module or combination of component/modules illustrated therein.

The query component 232 builds a query, or stream set statement, that identifies streams to be included in a stream set. In addition, the query may specify virtual column data that should be included in the stream set. The query component 232 may provide a user interface through which a query may be drafted by a user. The query component 232 may provide one or more template queries that the user can modify to create an active query. For example, the query component 232 may provide an interface that allows the user to only specify a date range and automatically generates the query to retrieve streams generated within that date range. The actual query may be stored in the same file directory as the source data streams. The query component may allow the user to specify virtual column data that is to be included in the resulting stream set. The query component may also allow the user to specify one or more filters to exclude certain data streams.

The virtual column component 234 injects data into a virtual column within a rowset. A rowset is a data structure that may resemble a row in a table. The rowset has fields for different data; each field corresponds to a column. A rowset does not actually need to be part of a table. The virtual column data may be extracted from a stream name and associated with a field in the virtual column.

The table component 236 generates a table, rowset, or other data structure that is a union of multiple streams. The table may be generated in accordance with an execution plan, which is described in more detail with reference to FIGS. 3-6. The result component 238 generates a result from the stream set.

Figure 3:
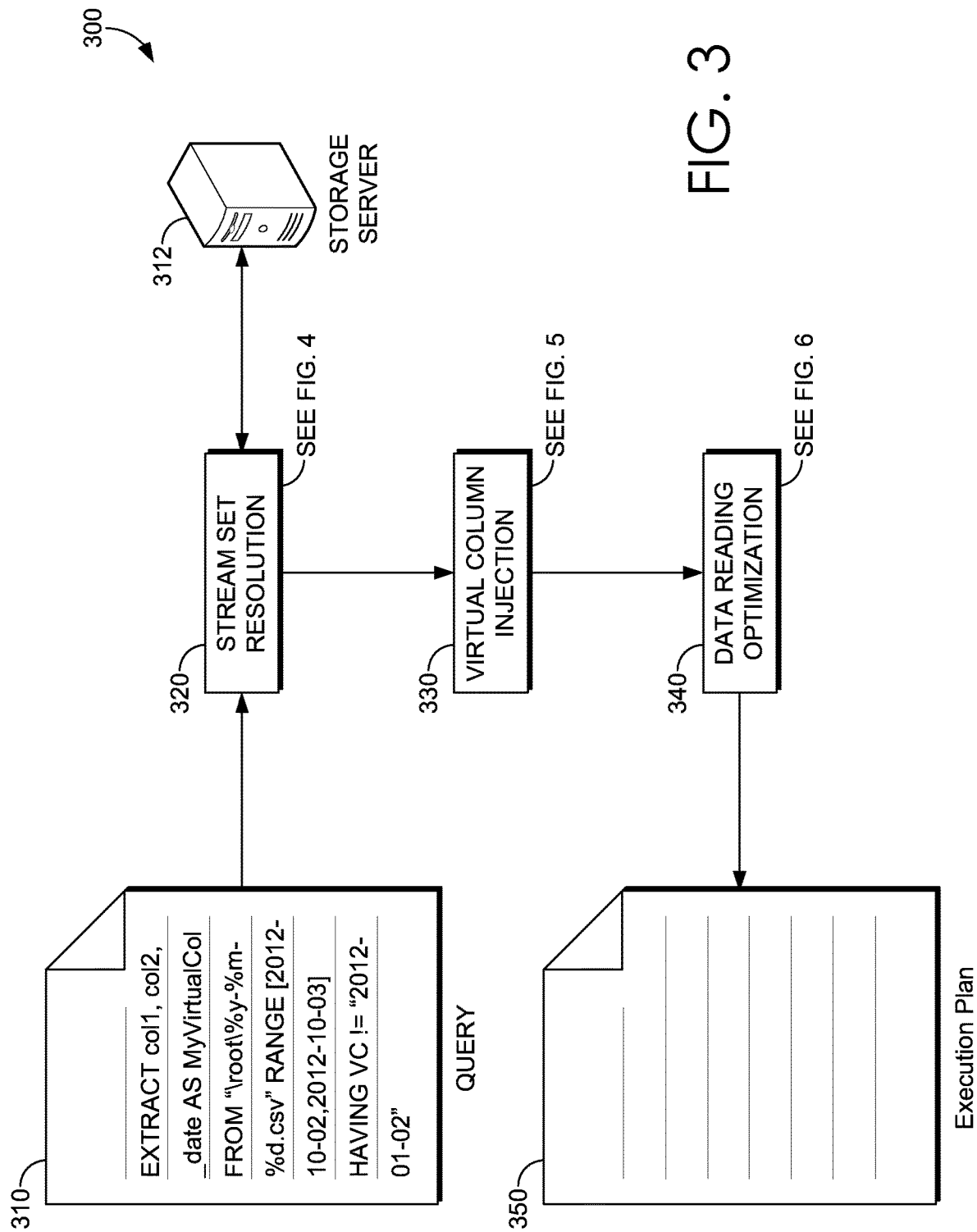
FIG. 3 is a diagram of a stream set generation process, in accordance with an embodiment of the present invention.

Turning now to FIG. 3, a process 300 of retrieving data from streams to form a stream set is shown, in accordance with an embodiment of the present invention. Initially, a query 310 is generated. The query may be generated manually by a user or automatically using various templates. The query follows a pattern that matches a pattern used to name data streams. The query pattern comprises a constant value, a placeholder, and a range. The constant value will be the same in all streams returned as a result of the query. Data within the range is substituted into the placeholder to generate potential stream names. The placeholder corresponds to a virtual column in the stream name. The range is expressed in a format that matches the data format used in the virtual columns. For example, the range could be expressed as an integer, date, or other format.

For example, a query may be used to retrieve all data streams generated during a designated time period. The following query specifies all the daily click data streams ranging from 1 Oct. 2012, through 3 Oct. 2012:

```
EXTRACT col1, col2, __date
AS My__VirtualColumn
FROM @"/root/%Year-%Month-%Day.csv"
RANGE[2012-10-01,2012-10-03].
```

In the example above, "/root/%Year-%Month-%Day.csv" represents a data template where %Year, %Month, %Day are date placeholders and "/root/" is a constant defining a file location and/or root directory.

As mentioned earlier, many online service applications generate a new stream every hour or daily. For example, a click stream may be created that captures all clicks received within one hour. Thus, many of the record streams are associated with a specific time stamp. The time stamp may be used to create a virtual column. The time stamp information may be included in the virtual column instead of storing a separate column within the stream indicating a time for each record.

A virtual column enables the extraction of information embedded in the stream name. The virtual column can be used like and behaves as any other column in the data set. Every virtual column value maps to a unique combination of placeholder value and vice versa. The range represents a collection of virtual column values. This value is determined by the start of the range, end of the range, and a counter expression. The counter expression determines the incremental increase from the start of the range until the end. In one embodiment, the default counter expression is one.

During process 320, the stream set resolution is generated in response to the query 310. Details about the stream set resolution process are described in FIG. 4. The stream set resolution process is the first phase for adding streams to the stream set. The stream set resolution process executes the query to generate all file names that are consistent with the query and then determines whether the file names generated actually exist in the storage server 312 and returns a list of results. Though depicted as a single storage server 312, the storage server 312 could be a cluster of storage servers.

Figure 4:
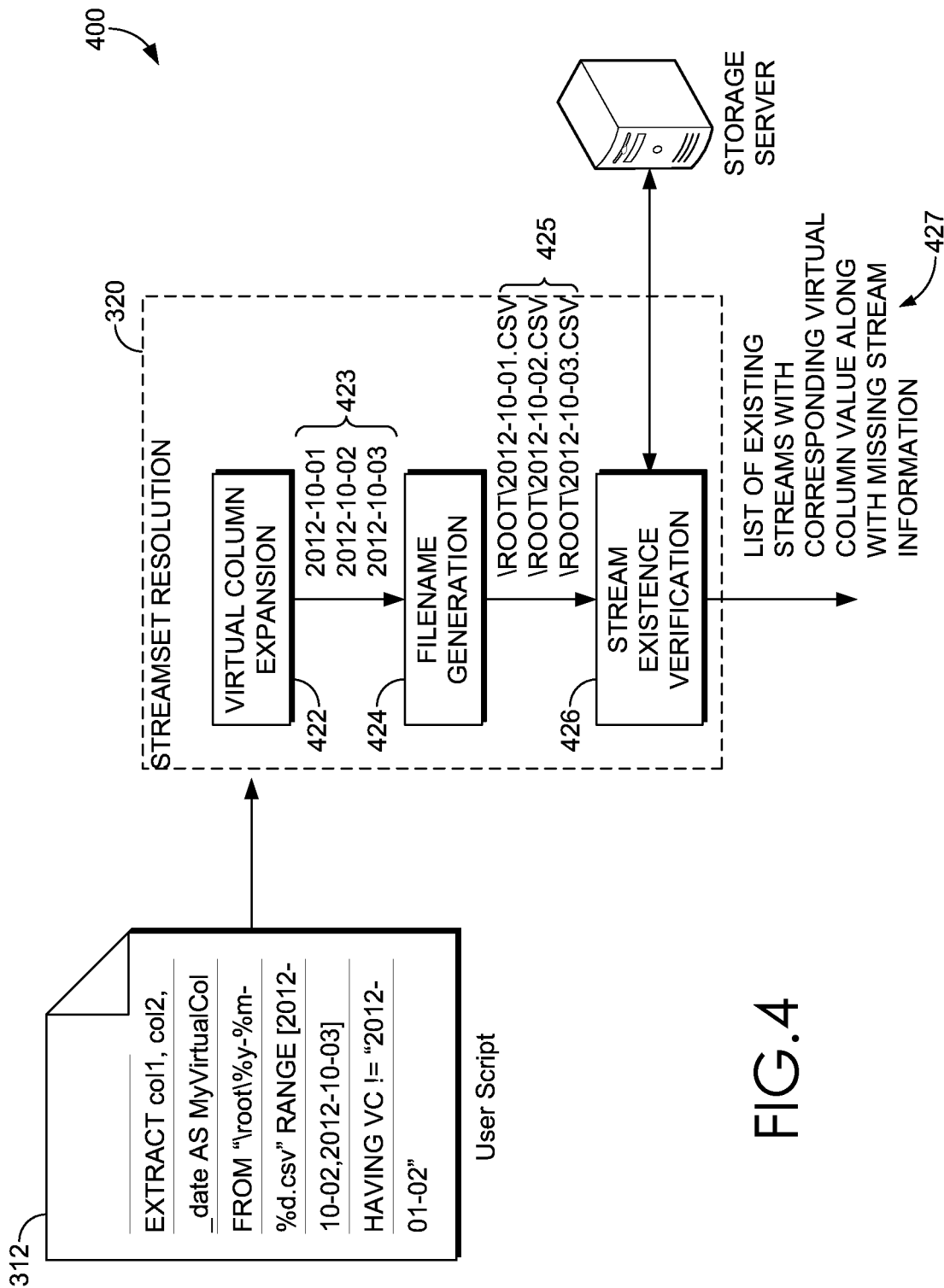
FIG. 4 is a diagram of a stream set resolution process, in accordance with an embodiment of the present invention.

As shown in FIG. 4, the stream set resolution process may be further divided into three steps. The virtual column expansion step 422 generates potential stream names without doing a directory enumeration. The stream names are generated by inserting each value within the specified range into the placeholders in the query to form a virtual column value and then combining each virtual column value with the constant value in the query to form a potential name. As mentioned, the values in the range may include the first value, the last value, and values in between that are consistent with the counter expression. The example in FIG. 4 demonstrates that the expansion step 422 will generate three values starting from 2012-10-01 and incremented by one day to virtual-column value set 423 that includes 2012-10-01, 2012-10-02, and 2012-10-03.

At step 424, file name generation is performed. The file names are generated for each virtual-column value in set 423. The file names are generated using the pattern specified in the stream set expression. The file names are generated by combining the constant value with each virtual-column value in set 423 according to the pattern. The pattern in the query may specify the values in the potential file names and an arrangement of those values. An extension associated with the type of file may be added. The file names generated through the file name generation process 424 are shown as name set 425 and include \ROOT\2012-10-01.CSV, \ROOT\2012-10-02.CSV, AND \ROOT\2012-10-03.CSV. In this case, "\ROOT\" is a constant value that corresponds with a root directory or storage location for the data stream.

At step 426, stream existence verification is performed. The stream existence verification 426 compares the list of potential file names in name set 425 to file names actually available in the storage server 312. In one embodiment, any missing file names are presented to the user. The user may be given a choice whether to abort the stream set generation or to continue. The user may also make this choice by establishing default preferences. In one embodiment, the process continues even when data is missing.

Returning now to FIG. 3, the list of existing or available streams with their corresponding virtual columns along with missing streams, if any, 427 is communicated to the virtual column injection process 330. The virtual column injection process is described in more detail with reference to FIG. 5.

Figure 5:
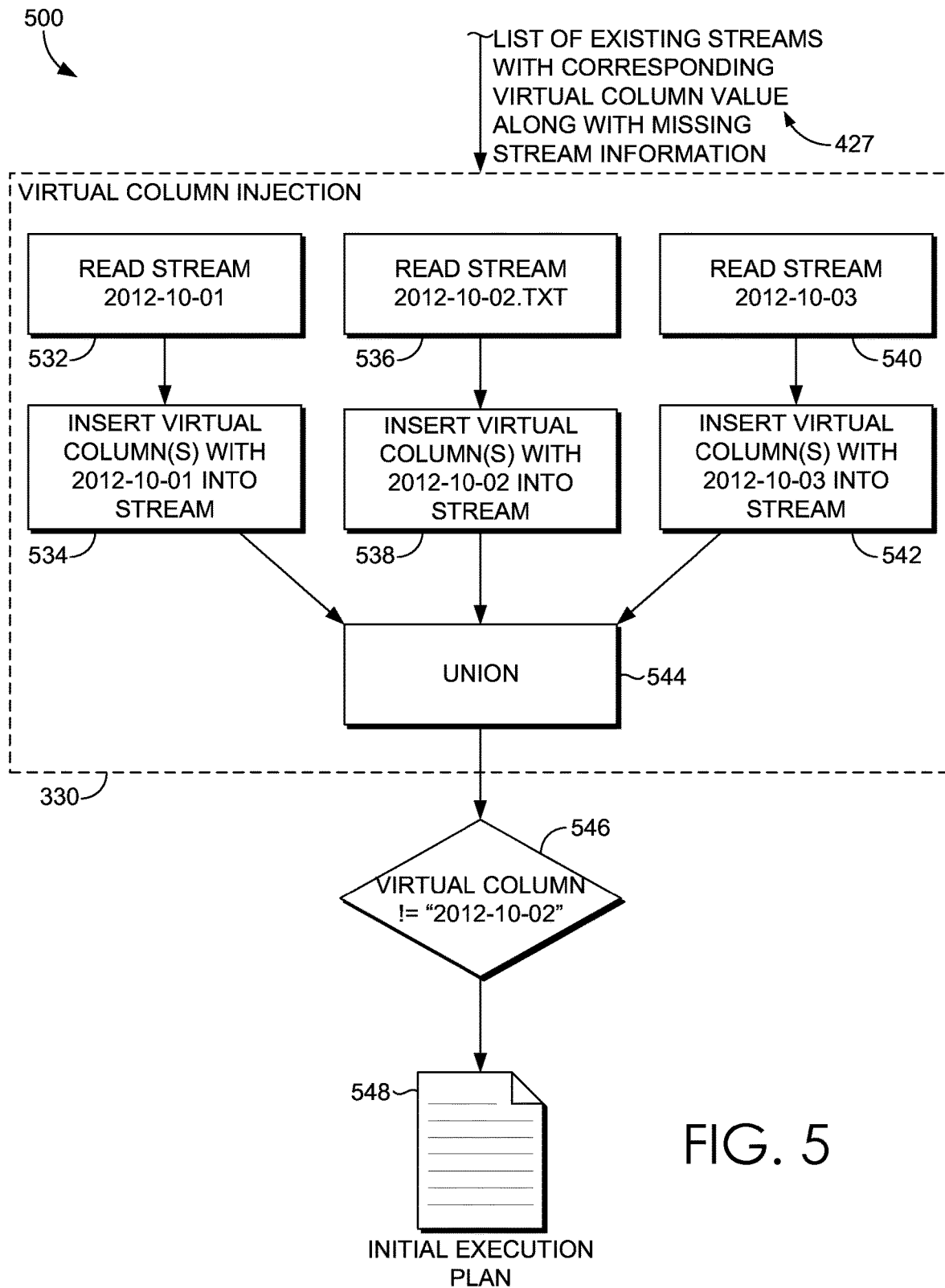
FIG. 5 is a diagram of the virtual column-injection process, in accordance with an embodiment of the present invention.

As shown in FIG. 5, the virtual column injection phase 330 takes the lists of full file names along with corresponding virtual column values as input and generates an initial execution plan 548. The initial execution plan 548 includes extraction of the designated streams followed by insertion of corresponding virtual column values into the stream. Once the virtual column is injected into the stream, a union set operation is performed to generate a single data entity. The data in the streams may be combined using operations other than a union operation.

Thus, as part of virtual column injection, stream 2012-10-01 is read at step 532 and the value "2012-10-01" is inserted into the stream at step 534. In one embodiment, the value "2012-10-01" is inserted into each rowset extracted from the corresponding stream. Similarly, stream 2012-10-02 is read at step 536, and the virtual column value 2012-10-02 is inserted into the stream at step 538. At step 540, the stream 2012-10-03 is read, and at step 542, the virtual column value 2012-10-03 is inserted into the stream.

At step 544, a union is proposed. This entire plan is memorialized within initial execution plan 548. The initial execution plan 548 lists a filter 546 on stream 2012-10-02 as a separate step.

Figure 6:
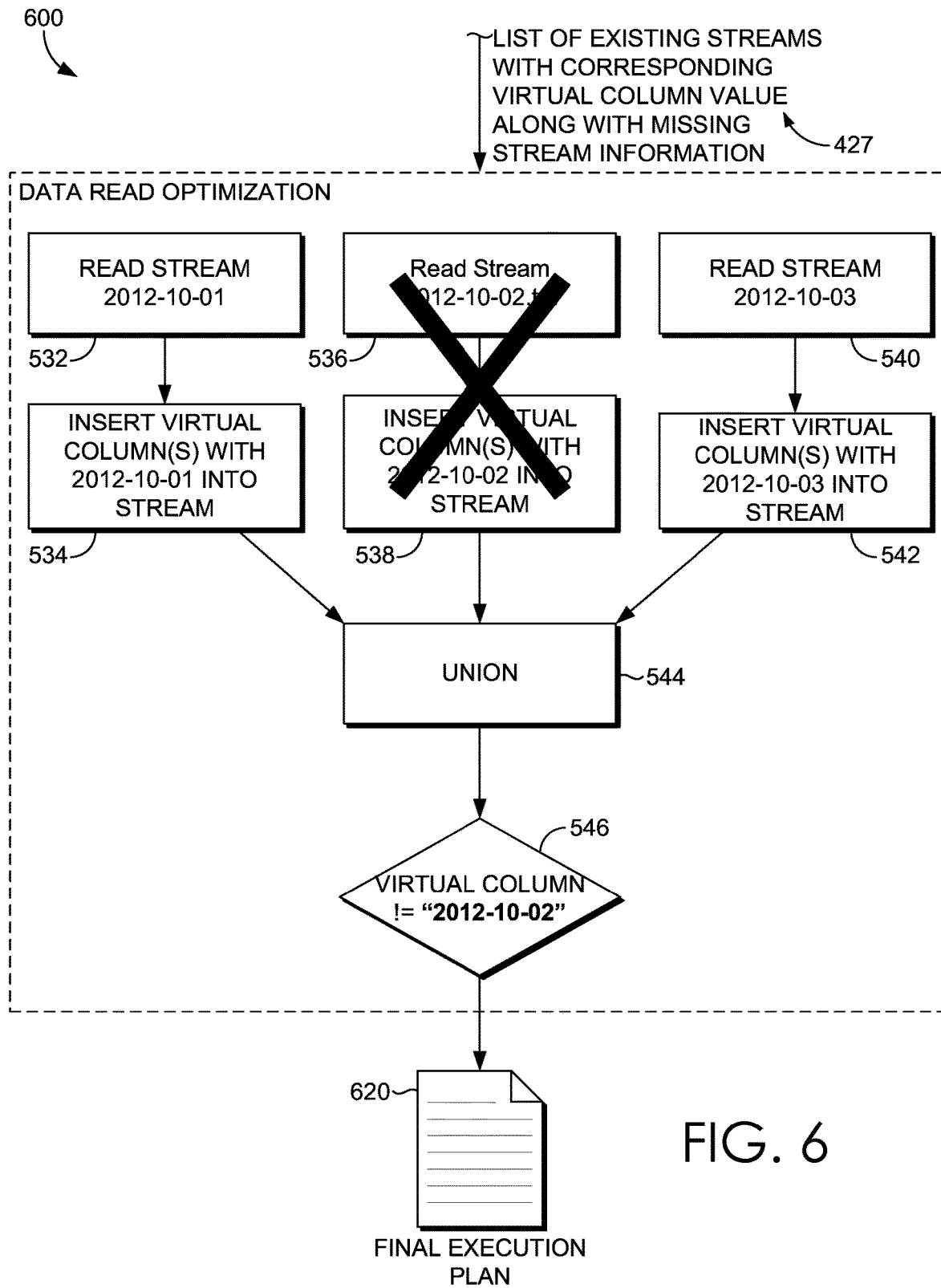
FIG. 6 is a diagram of the data-reading optimization process, in accordance with an embodiment of the present invention.

Returning to FIG. 3, at step 340, a data reading optimization is performed. The data reading optimization is described in more detail with reference to FIG. 6. For large process systems, it may be advisable to avoid reading data that is not a part of the final output and is not used to generate the final output. The data reading optimization phase tries to optimize the execution plan by avoiding reading any unwanted data. For instance, from the example below, the data in stream 2012-10-02.txt has no impact on output as it is filtered out of the data. Thus, as is shown in FIG. 6, the optimizer will generate an execution plan which avoids reading the 2012-10-02.txt stream. As can be seen, these steps are crossed out in FIG. 6. Thus, the new or final execution plan considers the filter 546 by eliminating step 536 and step 538. Once the final execution plan 620 is run, a data structure, such as a table, including information from read stream 2012-10-01 and read stream 2012-10-03 will be generated along with a virtual column that includes a value identifying the source data stream.

Exemplary Stream Set Creation

The following simple example illustrates the creation of a stream set. Much of the scripts follow the SCOPE language, but embodiments are not limited to use of SCOPE. In one embodiment, format for data streams is specified and used to name data streams and later identifies those data streams using a query that matches the format of information in the corresponding stream names. The default stream format may be saved as a StreamSet.ini and saved in the root directory. In this example, "/local/data/" is the root directory and the StreamSet.ini looks like:

[StreamSet]
Template= log%n.txt
VirtualColumns=_serialnum

Assume that data streams log1.txt, log2.txt, and log3.txt exist in directory "/local/data/" and their contents are shown in Table 1.

TABLE 1

| Log1.txt | Log2.txt | Log3.txt |
|---|---|---|
| A | B | C |
| D | E | F |
| G | H | I |

Initially, a query may be used to identify relevant data streams. The query may specify a range of streams using a template that considers the stream titles and locations. For example:

EXTRACT col, _serialnum
FROM STREAMSET "/local/data/" RANGE _serialnum=["1", "3"]
USING DefaultTextExtractor;
OUTPUT TO "/my/result.txt";

The above query is written using SCOPE (Structured Computations Optimized for Parallel Execution) scripting language. The "col, _serialnum" specifies that the extracted data will come from two columns; "col," and "_serialnum." The column "_serialnum" is a virtual column. In the FROM statement, "/local/data" is a constant value that corresponds to a location where a series of data streams are stored. The "log%n" specifies a virtual column template where %n is a placeholder. ".txt?" is part of the extension on the data stream files. The "serialnum=1 . . . 3" expression specifies a range. "USING DefaultTextExtractor" specifies the text extractor program that will extract data from the data streams.

SCOPE will generate potential file names by substituting values 1, 2, and 3 from the range into the placeholder "%n."

In this case, three files are generated: "/local/data/log1.txt," "/local/data/log2.txt," "/local/data/log3.txt." Each file is a potential data stream. As mentioned above, the existence or availability of each data stream may be confirmed. In this example, "log1," "log2," and "log3" may each represent data for a virtual column. Alternatively, the virtual column data could be 1, 2, and 3. Once confirmed, data may be extracted from these files to create a stream set that may be searched as a single data object.

After running the script to extract data, the result is shown in Table 2 (rows may appear in arbitrary order). As can be seen, the row data from the data set is included in the "col" column and the serial number associated with the data stream is included in the virtual "_serialnum" column. The numbers 1, 2, and 3 were not within the data stream record. The number in the virtual "_serialnum" column may be used to identify from which data stream the data in the first column originated.

TABLE 2

| Col | _serialnum |
|-----|------------|
| A | 1 |
| D | 1 |
| G | 1 |
| B | 2 |
| E | 2 |
| H | 2 |
| C | 3 |
| F | 3 |
| I | 3 |

Virtual columns are used to define a stream set and specify a range of inputs. A stream set comprises multiple components. The entire address specification "/local/data/log%n.txt?serialnum=1 . . . 3", can be split into the following parts:

1. Root ("/local/data/"): the root directory where the stream set is defined.
2. Template ("log%n.txt"): the Template that is used to create actual paths for inputs.
3. Placeholder ("%n"): part of the Template that will be replaced by actual values from the virtual column.
4. VirtualColumn ("serialnum"): the actual virtual column value that is used to partition the input into different files.
5. Range (1 . . . 3): the range for the associated virtual column values.

To obtain the input files, a compiler completes three steps: enumeration, file name generation, and file verification. For simplicity, the following example includes one virtual column, though multiple virtual columns are possible. During enumeration, the compiler takes the range of the virtual column, and expands the range to obtain all the values within the range. In this example, the range is 1 to 3. The compiler increases the value of serialnum, in increments starting at the lower bound of the range. The incremental step may be specified. Therefore, after enumeration, 1, 2, and 3 are valid virtual column values.

Next, during file name generation, the compiler takes each value of the virtual column, using a format to generate a corresponding value (in stream) to the associated placeholder(s), and plugs each value into the pattern. The rule to map each serialnum value to %n value is just converting the int. value into a stream. Therefore, we get 1.txt, 2.txt and 3.txt. Then, the scope compiler attaches the root to the beginning of each generated template value, and obtains a list of file names (with full path). In this example, they are as follows:

a. /local/data/log1.txt
b. /local/data/log2.txt
c. /local/data/log3.txt

If multiple virtual columns are used, all possible combinations of valid virtual column values may be used to generate file names.

In the file verification step, the compiler verifies whether each file actually exists and retrieves file metadata, such as file size and creation time. If specified by the user, missing files are acceptable as long as at least one file is in the stream set. Otherwise, the compiler fails the compilation and tells the user that the compiler is not able to find the file.

The previous illustration shows that certain properties of a stream set are stable among different queries: the root, the Template, the placeholder(s), the virtual column(s), and the step(s) used to expand the virtual column(s). But the range of each virtual column is query specific. In one embodiment, the language syntax is organized to include fixed parts of a StreamSet.ini and only the query-specific-part range stays in the EXTRACT or SSTREAM statement.

To use the virtual column feature, under the root directory, StreamSet.ini is used within both the template and the virtual column definition. The template is a pattern with placeholder(s) for virtual columns Notice that all the placeholders for the virtual columns appear in the template at least once. If the template is defined as %m/%d.txt for virtual column_date, and since %Y is not used in the template, then this is not a valid template when the date format in the stream name includes %Y and will cause compilation failure or other error.

In one embodiment, virtual columns are defined as follows: VirtualColumns=virtualColumn1, virtualColumn2, . . . , virtualColumnN. Each of virtualColumni (for i=1 to N) is either a name or name:type(step). In one embodiment, virtual column names begin with "_." Normal columns that begin with "_" would not be valid. In the above example, normal column "col" did not begin with "_."

SCOPE supports system columns shown in Table 3, but embodiments of the invention are not limited to use with SCOPE.

TABLE 3

| Name | Type | Step | How to specify in StreamSet.ini |
|------|------|------|------------------------------|
| _serialnum | int | 1 | _serialnum |
| _date | DateTime | 1 day | _date |
| _hour | int | 1 hour | _hour |
| _datetime | DateTime | A valid TimeSpan | _datetime:DateTime(step), where step is a stream that can be parsed by TimeSpan.Parse( ) |

The following Table 4 summarizes valid placeholders used in the template and their relationships with the associated virtual column formats.

TABLE 4

| Symbol | Value | Matching |
|--------|-------|----------|
| %Y | 4-digit number | Year of _date |
| %m | 2-digit number | Month of _date |
| %d | 2-digit number | Day of _date |
| %h | 2-digit number | _hour |
| %n | arbitrary-digit number | _serialnum |
| %Year | 4-digit number | Year of _datetime |
| %Month | 2-digit number | Month of _datetime |
| %Day | 2-digit number | Day of _datetime |
| %Hour | 2-digit number | Hour of _datetime |

TABLE 4-continued

| Symbol | Value | Matching |
| --- | --- | --- |
| % Minute | 2-digit number | Minute __datetime |
| % Second | 2-digit number | Second of __datetime |

In addition to supporting system columns, embodiments of the invention also support user-defined virtual columns. The virtual columns could be of the int, long, and DateTime type. In one embodiment, only one placeholder is allowed to be associated with one virtual column. For example, if the virtual column name is _foo, then the place holder is %foo.

A format for a user-defined virtual column is Name:Type (Step). Name is the virtual column name. Type is int, long, or DateTime. And Step is a string (double quoted) that can be parsed by Int.Parse, Long.Parse, or TimeSpan.Parse.

Here is an example of a user-defined virtual column:

```
[StreamSet]
...
Template=%foo.txt
VirtualColumns=_foo:int("2")
...
```

The definition defines a column called _foo, with placeholder %foo. _foo is an int with step 2. The placeholder for int or long is just the string representation of the number without any 0 added in the beginning. The placeholder for DateTime may follow the following format: YYYY-MM-DDTHH:MM:SS.

An exemplary syntax for the virtual column feature in the EXTRACT statement is shown as follows:

```
EXTRACT column [, column ...], [ virualcolumn, ...]
FROM [SPARSE] STREAMSET "rootpath"
RANGE _virtualcolumn=["lowerBound", "upperBound"],
[_virtualcolumnn=["lowerBound", "upperBound"], ...]
USING MyExtractor
HAVING predicate;
```

Column in the EXTRACT statement allows user to specify columns which they want to extract from the stream(s). A user cans specify one or more virtual columns to extract information embedded in the stream name. Virtual columns are specified by name (not name:type), and the type is the original type defined in StreamSet.ini. [SPARSE] STREAMSET "rootpath" RANGE . . . is included in the FROM clause. "Rootpath" is the path that points to the root of the stream set. StreamSet.ini is placed in this directory. SPARSE is an optional keyword. If one needs to use a sparse stream set, this keyword may be specified. RANGE is a keyword that is used to specify a range per virtual column, where both lower bound and upper bound are string representations that could be parsed by int.Parse, long. Parse, DateTime.Parse for type int, long, and DateTime.

An exemplary syntax for the virtual column feature in the SSTREAM statement is shown as follows:

```
SSTREAM [SPARSE] STREAMSET "rootpath" RANGE
    _virtualcolumn1=["lowerBound", "upperBound"], ...,
    _virtualcolumnn=["lowerBound", "upperBound"];
```

All the columns, including all virtual columns will be retrieved by default, which is different from the EXTRACT statement. The EXTRACT statement allows a user to specify which columns to retrieve. The rest of the clauses are similar to the one used in the EXTRACT statement.

The virtual column may be used like any other column to indicate data that should be included in the final stream set. The following example includes the values from the _serial number virtual column in rowsets generated from the available streams and eventually in the stream set.

```
RS1 = EXTRACT a:int,b:string, _serialnum
FROM STREAMSET "/local/data/"
RANGE _serialnum=["1", "200"]
USING DefaultTextExtractor( );
SELECT b,_serialnum AS MyVirtualColumn, a +_serialnum AS
myexpression FROM RS1;
```

The following example includes the values from the multiple virtual columns in rowsets generated from the available streams and eventually in the stream set.

```
EXTRACT a:int, _hour, _serialnum
FROM SPARSE STREAMSET "/local/data/"
RANGE _hour=["1","23"], _serialnum=["1","3"]
USING DefaultTextExtractor;
SELECT a, _hour AS HOUR, _serialnum AS SNUM
ORDER BY SNUM,HOUR,ABC;
OUTPUT TO "/local/data/output/Myoutput.txt";
Corresponding streamset.ini file
[StreamSet]
Template=log%n%h.txt
VirtualColumns=_serialnum , _hour
```

The EXTRACT statement may be used to filter data based on information in the virtual column Streams having virtual column values that match the filter are used to form the streamset, while those that do not match are excluded. The following example extracts streams with even serial number form a given range.

```
EXTRACT a:int,b:string, _serialnum
FROM STREAMSET "/local/data/"
RANGE _serialnum=["1", "200"]
USING DefaultTextExtractor( )
HAVING _serialnum%2 == 0;
```

Figure 7:
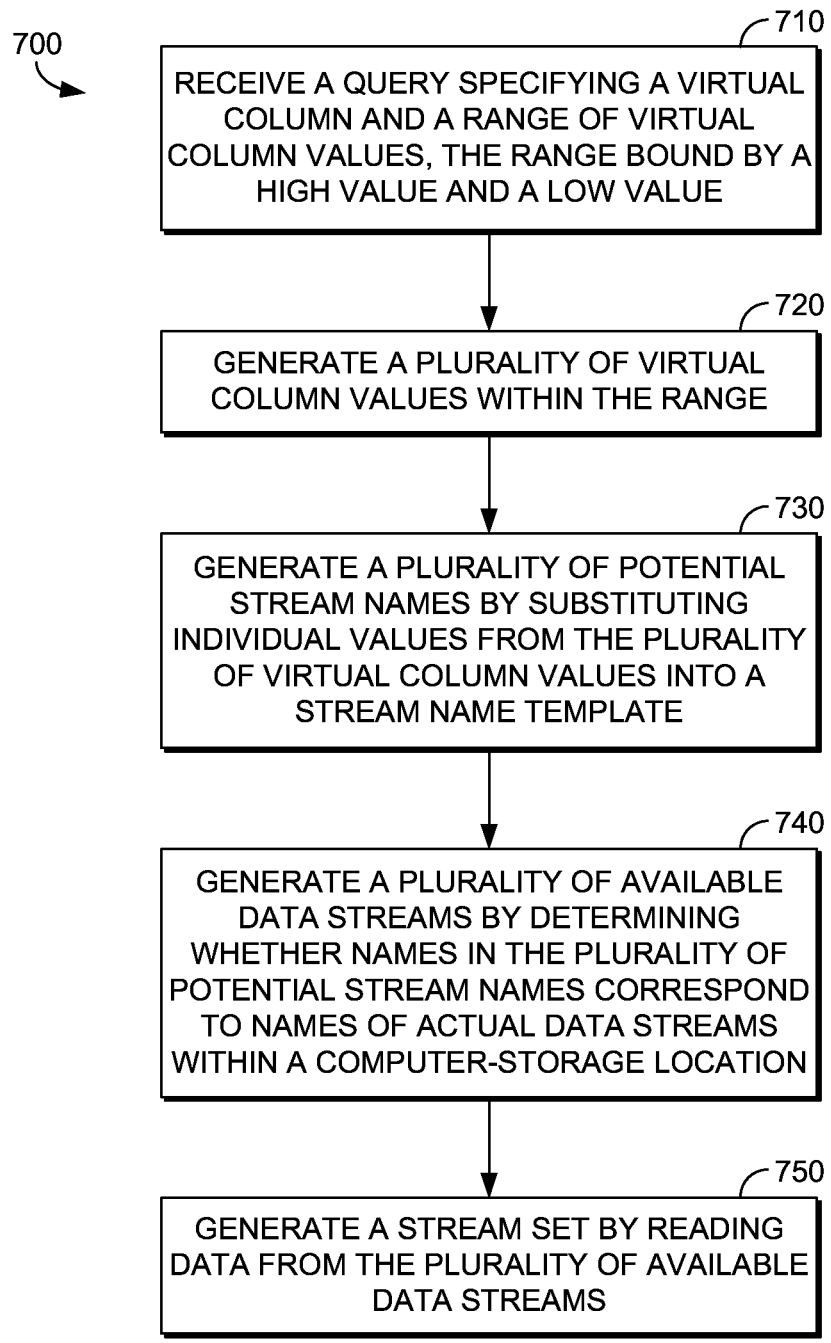
FIG. 7 is flow chart showing a method of generating a stream set that includes data from multiple data stream files, in accordance with an embodiment of the present invention.

Turning now to FIG. 7, a method 700 of generating a stream set that includes data from multiple data stream files is provided, in accordance with an embodiment of the present invention. A data stream may be an unstructured byte stream of data. The data stream may be created by append-only writing to the end of the stream. The stream set comprises information gathered from multiple streams. The stream set may take the form of a single data structure, such as a table, that may be analyzed as a single data set.

At step 710, a query is received. The query specifies a virtual column and a range of virtual column values. The range is bound by a high value and a low value. For example, the range could be bound by July 1 on the low end and July 15 on the high end. A virtual column is formatted according to a template. The virtual column template includes a placeholder or variable. The virtual column is included within the name of a data stream. Each data stream within a directory may include the same virtual column, following the same format, but with different virtual column values. For example, a virtual column may specify a date of creation. Each data stream's name includes the virtual column with a virtual column value specifying a date of creation, such as July 1. A single data stream name may include multiple virtual columns. In one embodiment, the information in the virtual column is not found within the data stream's content.

The query specifies the virtual column using the same format or template as used to name the data stream. In one embodiment, queries are pregenerated and stored in the same file location as a group of related data streams. A group of data streams may be related when they store similar subject matter, such as click data. The pregenerated query may be retrieved by a user and edited to include a desired range. The pregenerated query may be executed, as edited, to identify responsive stream sets.

At step 720, a plurality of virtual column values within the range is generated. The plurality of virtual column values is generated by identifying all values within the range according to a specified increment. The increment may be specified within the query or specified by default. For example, if the increment is two, then four, six, eight, and ten are the virtual column values that would be generated from a range bound by four and ten.

At step 730, a plurality of potential stream names is generated by substituting individual values from the plurality of virtual column values into a stream name template. At step 740, a plurality of available data streams is generated by determining whether names in the plurality of potential stream names correspond to names of actual data streams in a computer-storage location. As mentioned, a data stream may not be available because it has been deleted, never existed, or is undergoing maintenance. Other reasons for a data stream's unavailability are possible.

At step 750, a stream set is generated by reading data from the plurality of available data streams. The data from the plurality of data streams may be combined according to operations specified, such as a join or union operation. In one embodiment, various filter operations may be performed in conjunction with combining information from the data streams. For example, certain data streams may be excluded from the stream set even though they fall within a specified range and are available.

Figure 8:
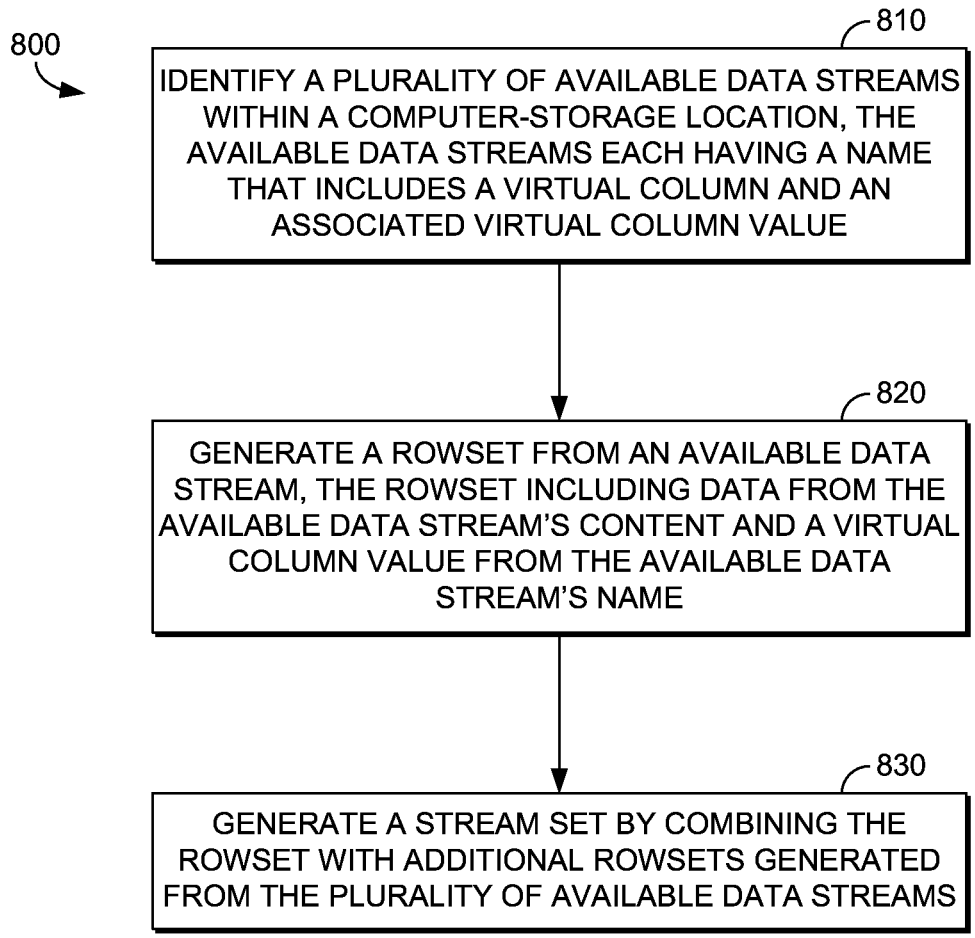
FIG. 8 is flow chart showing a method of generating a stream set that includes data from multiple data stream files, in accordance with an embodiment of the present invention.

Turning now to FIG. 8, a method 800 of generating a stream set that includes data from multiple data stream files is provided, in accordance with an embodiment of the present invention. At step 810, a plurality of available data streams within a computer-storage location is identified. The available data streams each have a name that includes a virtual column and an associated virtual column value. The available data streams may be generated using a method similar to method 700 described above. The virtual column follows a format that includes a placeholder for a virtual column value. Each data stream may have one or more virtual columns with unique virtual column values. In one embodiment, the data described in the virtual column is not described in the contents of the associated data stream.

At step 820, a rowset is generated from an available data stream. The rowset includes data from the available data stream's content and a virtual column value from the available data stream's name. The rowset is a data structure that may be similar to a row within a database table. For example, data within the rowset may be organized into fields. The virtual column value may occupy a field in the rowset. Multiple rowsets may be combined to form a table or some other data structure that may be analyzed as a single set of data.

At step 830, a stream set is generated by combining the rowset with additional rowsets generated from the plurality of available data streams. The stream set includes information from data stream's content and virtual column values.

Rowsets associated with different stream sets may include different virtual column values. Thus the rowsets forming the stream set may each include the same virtual column, but with different virtual column values indicating the data stream from which the rowset data originated.

Figure 9:
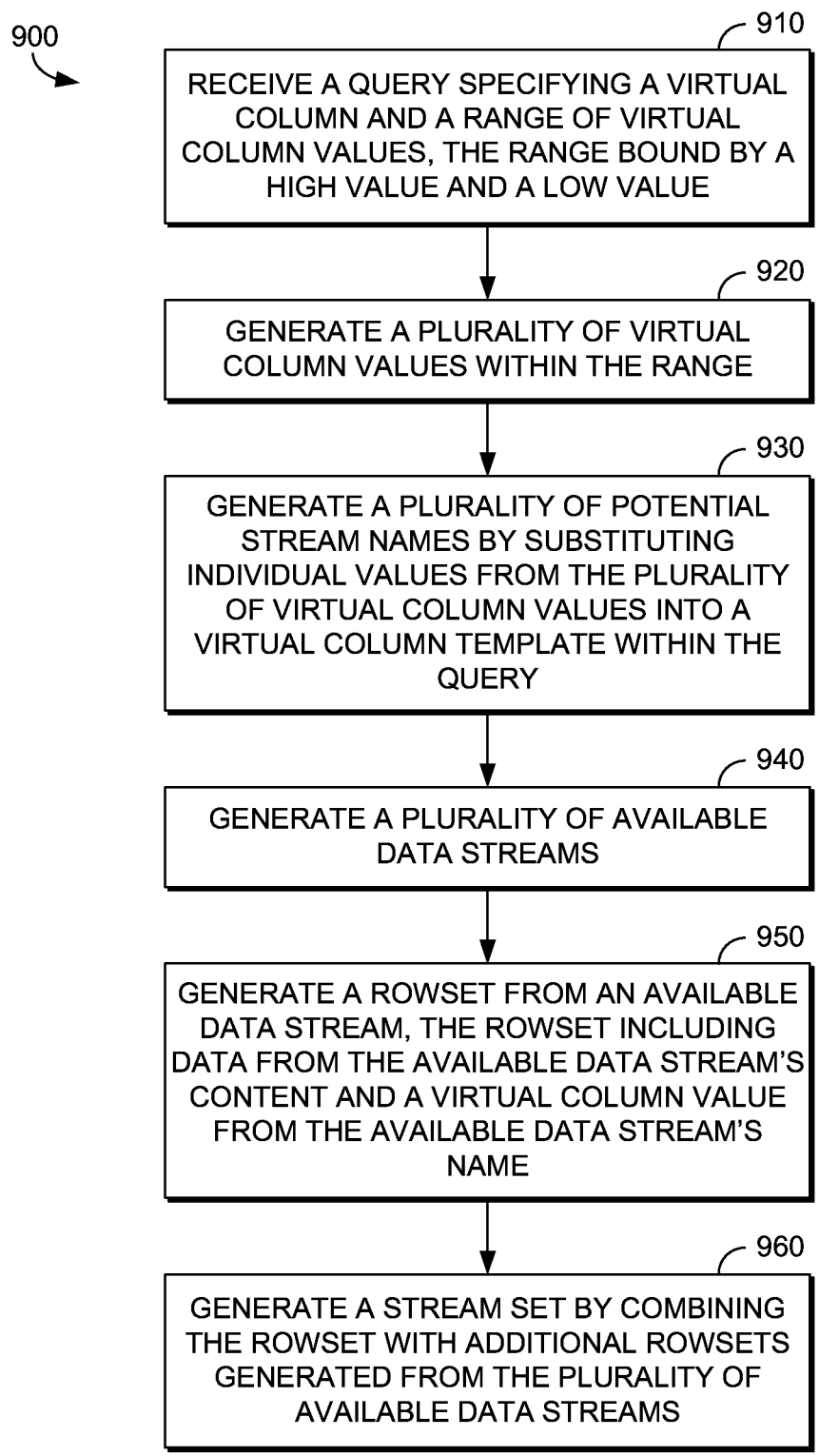
FIG. 9 is flow chart showing a method of generating a stream set that includes data from multiple data stream files, in accordance with an embodiment of the present invention.

Turning now to FIG. 9, a method 900 of generating a stream set that includes data from multiple data stream files is provided, in accordance with an embodiment of the present invention. At step 910, a query specifying a virtual column and a range of virtual column values is received. The range is bound by a high-value and a low value as described previously with reference to FIG. 7. At step 920, a plurality of virtual column values are generated. The virtual column values fall within the specified range according to a desired increment.

At step 930, a plurality of potential stream names is generated by substituting individual values from the plurality of virtual column values into a virtual column template within the query. At step 940, a plurality of available data streams is generated. At step 950, a rowset is generated from an available data stream. The rowset includes data from the available data stream's content in a virtual column value from the available data stream's name. At step 950, a stream set is generated by combining the rowset with additional rowsets generated from the plurality of available data streams.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more hardware computer-storage media having computer-executable instructions embodied thereon, that when executed by a computing device, cause the computing device to perform:
   receiving a query specifying a virtual column and a range of virtual column values, the range bound by a high value and a low value;
   generating a plurality of virtual column values within the range;
   modifying a stream name template by substituting placeholders in the stream name template with the plurality of virtual column values to generate a plurality of potential stream names;
   generating a plurality of available data streams by determining names in the plurality of the potential stream names by comparing the names in the plurality of the potential stream names to names of actual data streams within a computer-storage location, wherein one or more of the potential stream names are not able to correspond to one or more names of the actual data streams within the computer-storage location because one or more of the actual data streams corresponding to the one or more names of the actual data streams are undergoing maintenance; and
   generating a stream set by reading data from the plurality of available data streams.

2. The media of claim 1, wherein the range is expanded according to a specified increment.

3. The media of claim 2, wherein the specified increment is enumerated within the query.

4. The media of claim 1, wherein the instructions further cause the computing device to perform generating a notification when one or more of the potential stream names do not correspond to names of actual data streams.

5. The media of claim 1, wherein the virtual column comprises a placeholder into which virtual column values are substituted.

6. The media of claim 1, wherein the instructions further cause the computing device to perform injecting a virtual column value from a data stream's name into a rowset generated by extracting data from the data stream.

7. The media of claim 1, wherein the computer-storage location is specified in the query.

8. One or more hardware computer-storage media having computer-executable instructions embodied thereon, that when executed by a computing device, cause the computing device to perform:
- identifying a plurality of available data streams within a computer-storage location, the available data streams each having a name that includes a virtual column and an associated virtual column value, wherein one or more of the available data streams are not available because the one or more of the available data streams are undergoing maintenance;
- generating a rowset from an available data stream, the rowset including data from the available data stream's content and a virtual column value from the virtual column within the available data stream's name; and
- generating a stream set by combining the rowset with additional rowsets generated from the plurality of available data streams.

9. The media of claim 8, wherein the virtual column comprises a format comprising a placeholder into which virtual column values are substituted.

10. The media of claim 8, wherein the available data stream's content does not include the virtual column value from the available data stream's name.

11. The media of claim 8, wherein the additional rowsets within the stream set comprises the virtual column.

12. The media of claim 8, wherein said identifying the plurality of available data streams within the computer-storage location comprises running a pregenerated query that is stored in the computer-storage location.

13. The media of claim 8, wherein the instructions further cause the computing device to perform:
- receiving a query specifying a virtual column and a range of virtual column values, the range bound by a high value and a low value;
- generating a plurality of virtual column values within the range; and
- modifying a stream name template by substituting placeholders in the stream name template with the plurality of virtual column values to generate a plurality of potential stream names.

14. A method of generating a stream set that includes data from multiple data stream files, the method comprising:
- receiving a query specifying a virtual column and a range of virtual column values, the range bound by a high value and a low value;
- generating a plurality of virtual column values within the range;
- modifying a stream name template within the query by substituting placeholders in the stream name template with the plurality of virtual column values to generate a plurality of potential stream names;
- generating a plurality of available data streams by determining names in the plurality of the potential stream names by comparing the names in the plurality of the potential stream names to names of actual data streams within a computer-storage location, wherein one or more of the potential stream names are not able to correspond to one or more names of the actual data streams within the computer-storage location because one or more of the actual data streams corresponding to the one or more names of the actual data streams are undergoing maintenance;
- generating a rowset from an available data stream the rowset including data from the available data stream's content and a virtual column value from the virtual column within the available data stream's name; and
- generating a stream set by combining the rowset with additional rowsets generated from the plurality of available data streams.

15. The method of claim 14, the method further comprising:
- the one or more potential stream names are not able to correspond to the one or more names of the actual data streams within the computer-storage location because one or more of the actual data streams corresponding to the one or more names of the actual data streams never existed.

16. The method of claim 14, wherein the virtual column value is a date.

17. The method of claim 14, wherein the available data stream's content does not include the virtual column value from the available data stream's name.

18. The method of claim 14, wherein the additional rowsets within the stream set comprise the virtual column.

19. The method of claim 14, wherein the query is a pregenerated query that is stored in a computer-storage location where the plurality of available data streams are also stored.

20. The method of claim 14, wherein the virtual column comprises a format comprising a placeholder for virtual column values.

* * * * *